United States Patent [19]
Tzoganakis

[11] Patent Number: 5,444,795
[45] Date of Patent: Aug. 22, 1995

[54] SURFACE ROUGHNESS CHARACTERIZATION OF EXTRUDED PLASTIC PRODUCTS

[75] Inventor: Costas Tzoganakis, Kitchener, Canada

[73] Assignee: University of Waterloo, Waterloo, Canada

[21] Appl. No.: 99,563

[22] Filed: Jul. 30, 1993

[30] Foreign Application Priority Data

Jul. 31, 1992 [GB] United Kingdom ............... 9216392

[51] Int. Cl.$^6$ .............................................. G06K 9/00
[52] U.S. Cl. .................................. 382/141; 264/40.1; 348/86; 364/473; 364/556; 425/145; 425/173
[58] Field of Search ................... 382/28, 18, 8, 26, 8; 348/86, 125; 395/904; 364/473, 469, 556; 72/711; 425/145, 173; 264/40.2, 40.7, 40.1

[56] References Cited

U.S. PATENT DOCUMENTS

| | | | |
|---|---|---|---|
| 4,789,933 | 12/1988 | Chen et al. | 364/413.13 |
| 4,860,589 | 8/1989 | Williford | 73/799 |
| 5,204,124 | 4/1993 | Secretan et al. | 425/145 |
| 5,307,292 | 4/1994 | Brown et al. | 364/564 |

OTHER PUBLICATIONS

Arduini et al., "Multifractals and Texture Classification", Universit of Genoa, Italy.

Ballenger, T. F., I. J. Chen, J. W. Crowder, G. E. Hagler, D. C. Bogue, and J. L. White, "Polymer Melt Flow Instabilities in Extrusion: investigation of the Mechanism and Material and Geometric Variables," Trans. Soc. Rheol. 15, 195 (1971).

Barrett, A. M., M. D. Normand, M. Peleg, and E. Ross, "Characterization of the Jagged Stress-Strain Relationships of Puffed Extrudates using Fast Fourier Transforms and Fractal Analysis," J. Food Sci. 57, 227 (1992).

Beaufils, P., B. Vergnes, and J. F. Agassant, "Characterization of the Sharkskin Defect and its Development with the Flow Conditions," Intern. Polymer Processing IV, pp. 78, 80, 82, 84 (1989).

Bergem, N., "Visualization Studies of Polymer Melt Flow Anomalies in Extrusion," Proceedings of the 7th International Congress of Rheology (Swedish Society of Rheology, Gothenberg, 1976), pp. 50-54.

Blyler, L. L. and A. C. Hart, "Capillary Flow Instability of Ethylene Polymer Melts," Polym. Eng. Sci. 10, 193-203 (1970).

Cogswell, N. F., "Stretching Flow Instabilities at the Exits of Extrusion Dies," J. Non-Newt. Fluid Mech. 2, 37-47 (1977).

Denn, M. M., "Issues in Viscoelastic Fluid Mechanics," Ann. Rev. Fluid. Mech. 22, 13-35 (1990).

Denn, M. M., "Surface-Induced Effects in Polymer Melt Flow," in Theoretical and Applied Rheology, edited by P. Moldenaers and R. Keunings (Elsevier, Amsterdam, 1992), vol. 1, pp. 45-49.

Duvdevani, I. J. and I. Klein, "Analysis of Polymer Melt Flow in Capillaries Including Pressure Effects," SPE J. 23, 41 (Dec. 1967).

Hatzikiriakos, S. G. and J. M. Dealy, "Wall Slip of a Molten High Density Polyethylene I: Sliding Plate Rheometer Studies," J. Rheol. 35, 497 (1991).

Hatzikiriakos, S. G. and J. M. Dealy, "Wall Slip of a Molten High Density Polyethylenes 11: Capillary Rheometer Studies," J. Rheol. 36, 703 (1992a).

Hatzikiriakos, S. G. and J. M. Dealy, "Start-up of Pres-

(List continued on next page.)

*Primary Examiner*—Leo H. Boudreau
*Attorney, Agent, or Firm*—Sim & McBurney

[57] ABSTRACT

The surface roughness of an extruded polymeric material is determined by forming a digital image of the extruded surface of the polymeric material and then determining the fractal dimension of any surface distortions of the extruded surface from the digital image. The fractal dimension is a measure of surface roughness and is dimensionless. A value of one indicates a smooth surface, while higher values indicated degrees of roughness. This information may be used to adjust molding conditions to avoid the formation of surface roughness.

7 Claims, 6 Drawing Sheets

OTHER PUBLICATIONS

Melt Fracture," in B. Mena, A. Garcia-Rejon, and C. Rangel-Nafaille, eds., Advances in Rheology (UNAM Press, Mexico, 1984), vol. 3, p. 399.

Kurtz, S. J., "The Dynamics of Sharkshin Melt Fracture in LLDPE: Effect of Die Geometry," in Theoretical and Applied Rheology, edited by P. Moldenaers and R. Keunings (Elsevier, Amsterdam, 1992), vol. 1, p. 377.

Lau, H. C. and W. R. Schowalter, "A Model for Adhesive Failure of Viscoelastic Fluids During Flow," J. Rheol. 30, 193 (1986).

Lupton, J. M. and J. W. Regester, "Melt Flow of Polyethylene at High Rates," Polym. Eng. Sci. 5, 235 (1965).

Moynihan, R. H., D. G. Baird, and R. Ramanathan, "Additional Observations on the Surface Melt Fracture Behaviour of Linear Low-Density Polyethylene," J. Non-Netw. Fluid Mech. 36, 255 (1990).

Petrie, C. J. S. and M. M. Denn, "Instabilities in Polymer Processing," AIChE J. 22, 209 (1976).

Piau, J. M., N. El-Kissi, and B. Tremblay, "Low Reynolds Number Flow Visualization of Linear and Branched Silicones Upstream of Orifice Dies," Non-Newt. Fluid Mech. 30, 197-232 (1988).

Piau, J. M., N. El-Kissi, and B. Tremblay, "Influence of Upstream Instabilities and Wall Slip on Melt Fracture and Sharkskin Phenomenon during Silicones Extrusion through Orifice Dies," J. Non-Newt. Fluid Mech. 34, 145 (1990).

Ramamurthy, A. V., "Wall Slip in Viscous Fluids and Influence of Materials of Construction," J. Rheol. 30, 337 (1986).

Tordella, J. P., "Unstable Flow of Molten Polymers," sure Transients in a Capillary Rheometer," Proceedings of the 38th ANTEC, Detroit, (1992b), p. 1743.

Hatzikiriakos, S. G. and J. M. Dealy, "Role of Slip and Fracture in the Oscillating Flow of HDPE in a Capillary," to appear in J. Rheol, 36, (1992c).

Hatzikiriakos, S. G. and J. M. Dealy, "Start-up of Pressure Transients in a Capillary Rheometer," accepted in Polym. Eng. Sci. (1992d).

Hatzikiriakos, S. G., C. W. Stewart, and J. M. Dealy, "Effect of Surface Coatings on Wall Slip of LLDPE," accepted in Intern. Polym. Proc. (1992e).

Hill, D. A., T. Hasegawa, and M. M. Denn, "On the Apparent Relation between Adhesive Failure and Melt Fracture," Rheol. 34, 891 (1990).

Howells, E. R. and J. J. Benbow, "Flow Defects in Polyethylene Melts," Trans. Plast. Inst. 30, 240 (1962).

Kalika, D. S. and M. M. Denn, "Wall Slip and Extrudate Distortion in Linear Low-Density Polyethylene." J. Rheol. 31, 815 (1987).

Kurtz, S. J., "Die Geometry Solutions to Sharkskin in F. R. Eirich, ed., Rheology (Academic, New York, 1969), vol. 5, p. 57.

Tremblay, B., "Sharkskin Defects of Polymer Melts: The Role of Cohesion and Adhesion," J. Rheol. 35, 985 (1991).

Vinogradov, G. V. and L. I. Ivanova, "Viscous Properties of Polymer Melts and Elastomers Exemplified by Ethylene-Propylene Copolymer," Rheol. Acta 6, 209 (1967).

White, J. L., "Critique of Flow Patterns in Polymer Fluids at the Entrance of a Die and Instabilities Leading to Extrudate Distortion." Appl. Polymer Symposium 20, 155 (1973).

ically reviewed by Tordella (1969), White (1973), Petrie

SURFACE ROUGHNESS CHARACTERIZATION OF EXTRUDED PLASTIC PRODUCTS

FIELD OF INVENTION

The present invention relates to melt extrusion of polymers and, in particular to the surface roughness characterization of extruded plastic products.

BACKGROUND TO THE INVENTION

Ploymer melt extrusion at high rates may lead to a poor product quality due to the appearance of irregularities/defects on the surface of extrudates whenever the wall shear stress exceeds a critical value (Ramamurthy, 1986; Kalika and Denn, 1987). The onset of these defects is a limiting factor for production rates in many industrial operations such as blown film extrusion. These irregularities vary in intensity and form and may be generally classified into surface irregularities or surface melt fracture and gross irregularities or gross melt fracture (Ramamurthy, 1986). A considerable number of studies have addressed this problem over the past three decades and most of them have been critically reviewed by Tordella (1969), White (1973), Petrie and Denn (1976) and Piau et al. (1990).

Although there is still no general agreement on the causes of the phenomenon, it seems that two basic views prevail. According to the first one (Howells and Benbow, 1962; Cogswell, 1977, 1978; Kurtz, 1984; and Mounihan et al., 1990), the polymer extrudate fractures at the die exit due to an abrupt change in boundary conditions that lead to high stretching rates exceeding the melt strength. Kurtz (1984) has also pointed out that prior to the critical stretching, a critical shear stress must be exceeded. In support to this view, a more specific explanation of the polymer fracture has been recently proposed by Tremblay (1991) based on a numerical analysis of the flow at the die exit. According to the second view (Ramamurthy, 1986; and Kalika and Denn 1987), the onset of these extrudate distortions is accompanied by wall slip and failure or adhesion at the polymer-metal interface in the die land.

To characterize the form and intensity of extrudate distortion, various methods have been used in the past. Mainly profilometry techniques have been used to quantitatively describe the extrudate surface roughness (Beaufils et al. 1989, and Tong 1990). Recently, Kurtz (1991) used microphotography to study the factors influencing the sharkskin effect of linear-polyethylenes, a method which is painstaking and time-consuming.

SUMMARY OF INVENTION

In the present invention, a new approach has been adopted to study the sharkskin phenomenon of linear polyethylenes and other polymers.

In the present invention, there is provided a method for determining the surface roughness of an extruded polymeric material, which comprises forming a digital image of an extruded surface of a polymeric material, and determining the fractal dimension of any surface distortions of said extruded surface from said digital image as a measure of surface roughness.

In the present invention, therefore, the surface of samples of solidified plastics strands and films are analyzed by means of digital image processing techniques and the fractal dimension of the extrudate surface is used as a quantitative measure of surface roughness development.

A fractal dimension value of one corresponds to a smooth extrudate surface while higher values signify increasing degrees of roughness. The fractal dimension increases with both the extrusion shear stress and the slip velocity.

The porcedure of the present invention provides a roughness measure which is scale independent. Only digital images of extrudates are required for the detection of surface roughness and short processing times are involved. Accordingly, the procedure may be employed in on-line monitoring and control systems for the production of films with controlled roughness.

The solidified plastic strands may be obtained by extrusion of polymers, particularly linear low density polyethylene, through capillary dies.

GENERAL DESCRIPTION OF INVENTION

As indicated above, the present invention relates to the determination of the surface roughness of an extruded polymeric material. The method involves initially forming a digital image of the extruded surface and then determining the fractal dimension of any surface distortions of the extruded surface from the digital image. The fractal dimension provides a measure of surface roughness. A fractal dimension government of one corresponds to a smooth surface while higher values signify increasing degrees of roughness.

The fractal dimension may be determined in the following manner. A square grid is overlaid onto the digital image and the number of squares containing a piece of surface outline is counted. The sets of overlaying and counting for different sized squares. The ln(N) is plotted against ln(L) to yield a straight line having a slope of -D from the relationship:

$$N(L) = \alpha L^{-D}$$

wherein:

N (L) is the number of boxes of size L×L,

L is a measure of length in pixels,

D is the fractal dimension,

α is the proportionality constant dependent on the size of the image.

The fractal dimension is determined from the slope of the straight line.

The determination of the fractal dimension permits the provision of a procedure to inhibit the formation of surface roughness of an extruded polymeric material. Such procedure involves extruding a polymeric material and determining the fractal dimension of the surface of the extruded polymeric material as a measure of surface roughness. The conditions of extrusion then are adjusted to achieve a fractal dimension which is approximately unity.

The invention is described further with reference to certain experiments which have ben conducted and which are described in detail below and the results of which are detailed in the accompanying drawings.

INSTRUMENTATION AND EXPERIMENTAL PROCEDURES

Figure 1:
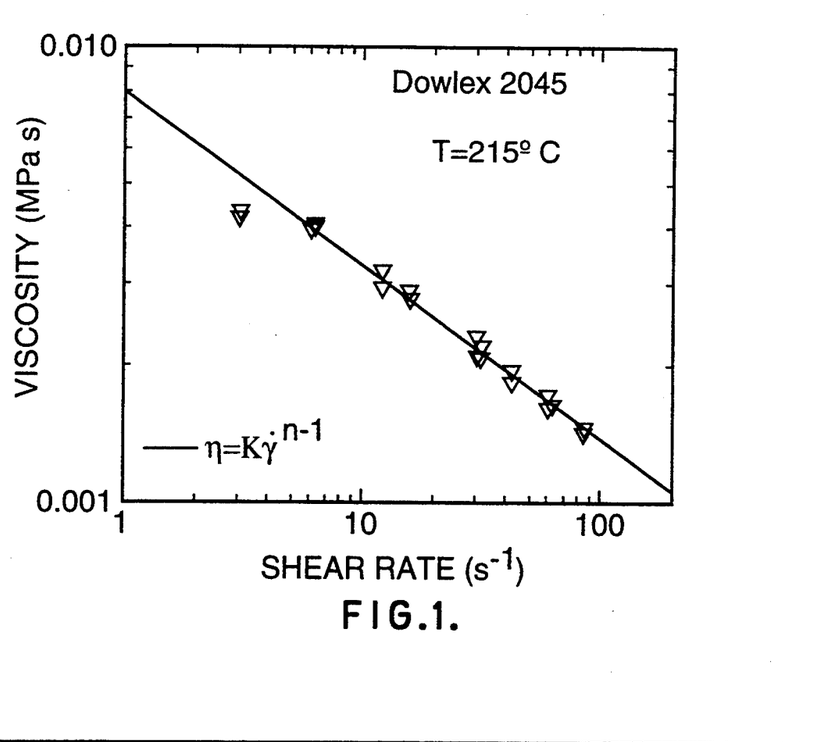
FIG. 1 is a graphical representation of the viscosity curve for the polymer employed in the experimentation described herein.

The material used in these experiments was a linear low density polyethylene, Dowlex 2045, provided by Dow chemical Canada Inc. This material had a reported melt index of 1.0, weight-average molecular weight of 118,000 and a polydispersity of 3.93. The viscosity curve of this polymer is shown in FIG. 1. Extrusion experiments were carried out of 215° C. and 230° C. on an Instron piston-driven, constant-speed capillary rheometer. Circular dies of various L/D ratios (10–100) and diameters (0.0254, 0.0362 and 0.132 cm) were used to determine the apparent flow curves and consequently the slip velocity of the resin used.

Figure 2:
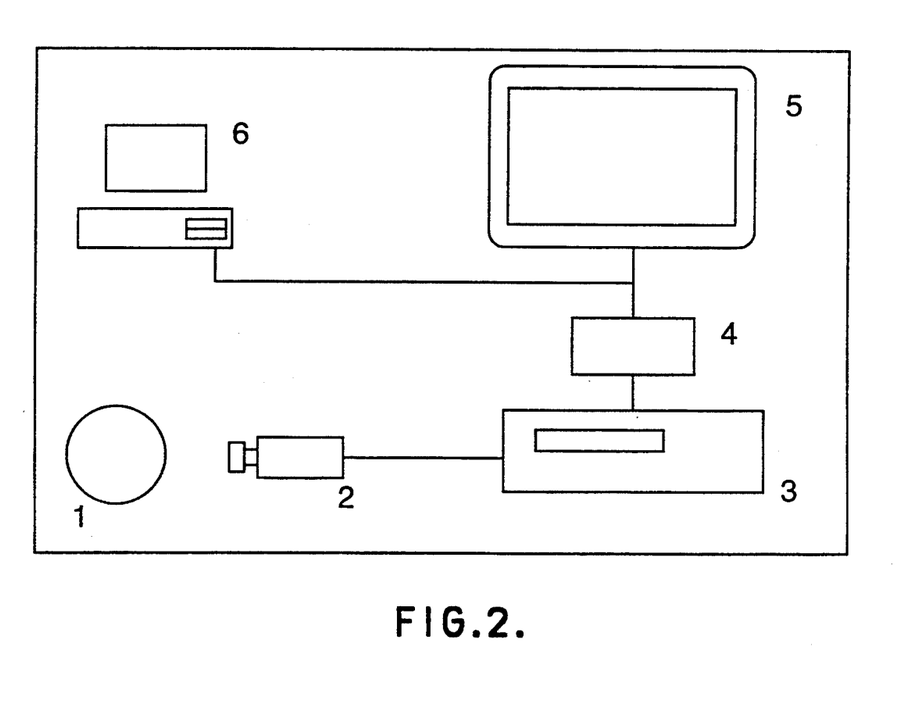
FIG. 2 is a schematic representation of a an experimental set-up used in the experimentation described below.
Figure 3:
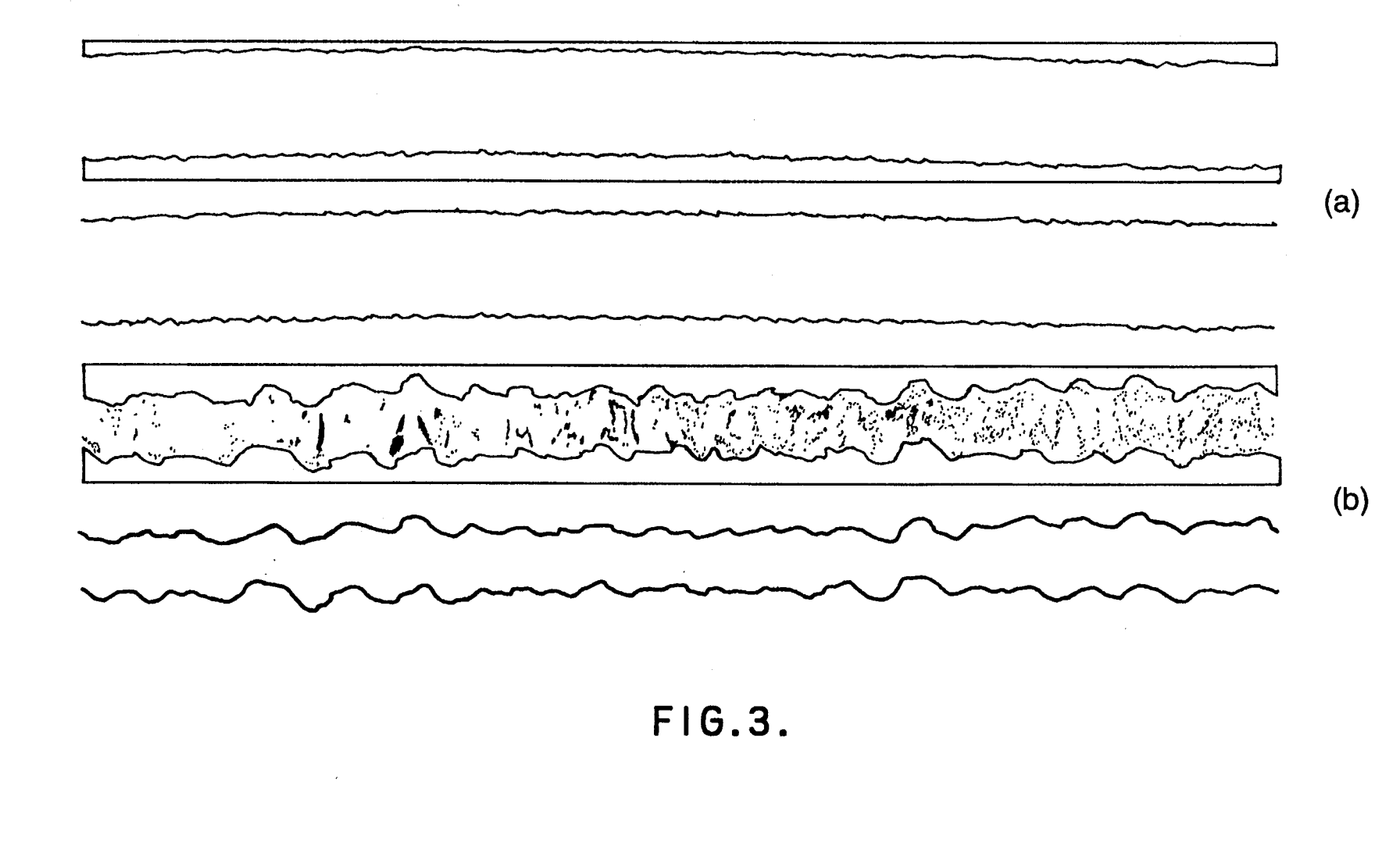
FIG. 3 shows the image of the typical samples exhibiting sharkskin and melt fracture defects.

The surface roughness of the extrudates obtained were analyzed by using digital image processing techniques. A digital image is one way of storing pictorial information in a computer. The image is divided up into a large number of small areas, called pixels, which are normally arranged in a rectangular array. The intensity of light associated with each pixel is measured and recorded. This way the actual image is represented by a large array of numbers corresponding to the light intensity of each pixel. In the experiments reported here, the image of the solidified extrudate surface was captured through a Panasonic WV-S050 color video camera. The image recorded, in standard VGA resolution, was then transmitted to a JVC BR6400U video cassette recorder and a Sony Trinitron KV20XBR TV monitor assembly. The signal from the VCR, in NTSC (National Television System Committee) format was converted to RS-170 RGB using a Data Translation DT2879 video decoder/encoder assembly. The converted signal was able to be recognized by the image processing board (IPB Model DT2970) which is able to capture images having a resolution of 640×480 pixels. An IBM PS/2 Model 80 microcomputer was used for addressing the IPB and subsequently processing of the signal. A schematic representation of the experimental set-up is shown in FIG. 2. A more detailed description of the hardware employed as well as of the image processing software along with the routines used to compute fractal dimensions, are given by Ellis (1992). The image of two typical samples exhibiting sharkskin and melt fracture defects are shown in FIG. 3 along with their surface outlines whose fractal dimension is determined.

FRACTAL DIMENSION

Fractal geometry is a generalization of Euclidean geometry which has helped scientists to address problems involving vary complex geometries. Euclidean objects (i.e. lines, circles, spheres, etc.) can be characterized by a finite number of sizes or length scales. A fractal is a shape made of parts similar to the whole in some way. Fractal shapes exhibit a property called self-similarity, or independence of scale (Mandelbrot 1982, Barnsley et al. 1988, Feder 1988, Takayasu 1990). In other words, magnified sections of a fractal object reveal repetitive levels of details regardless of the scale chosen, i.e. the structure of a fractal remains similar as one views the object at different resolutions. Euclidean objects such as line segments, squares, and cubes can be broken down into $N_E$ self-similar parts such that each part is scaled down by a ratio $$r_E = N_E^{\frac{-1}{E}} \tag{1}$$

where E is the Euclidean dimension, an integer. This scaling property extends to fractal objects. A D-dimensional object may be divided into N equal parts by a scaling factor $$r = N^{\frac{-1}{D}} \tag{2}$$

where D is the fractal dimension which need not be an integer. The fractal dimension provides a quantitative measure of how a fractal object scales or fills space. Geometric self-similarity is only one example of what has become known as fractal behavior. However, fractals and the concept of fractal dimension are continuously being used to study various properties of polymer solutions and melts that seem to exhibit irregular behavior. A survey of these efforts can be found in Avnir (1989).

Figure 4:
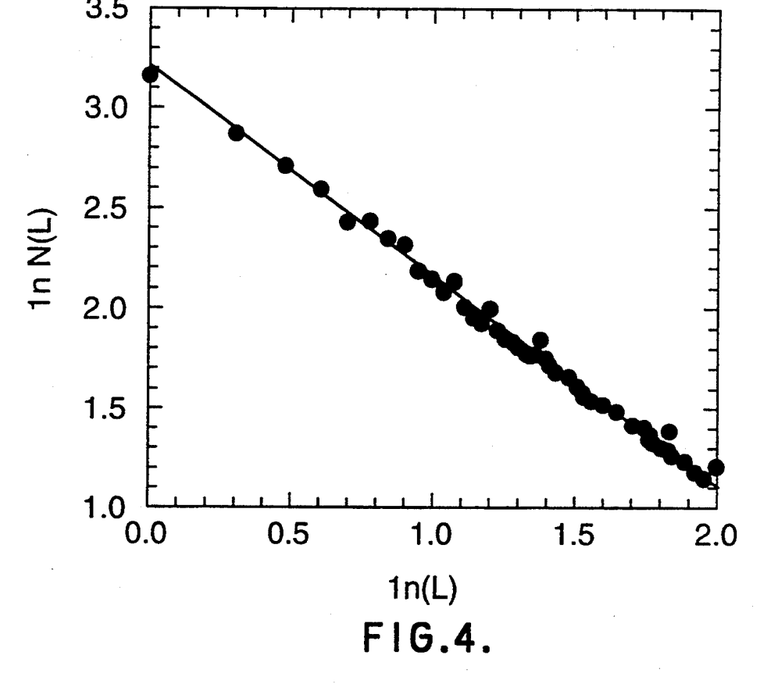
FIG. 4 is a plot of the straight-line relationship of parameters providing a slope of -D.

In the present invention, the fractal nature of the extrudate surfaces of polymer samples extruded under various conditions was studied. The fractal dimension of these surfaces was computed by implementing a box-counting algorithm (Barnsley et al. 1988, Falconer 1990). According to this algorithm, a square grid is overlaid onto the digitized image and the number of squares containing a piece of the surface outline is counted. The same procedure is repeated using grids with different size squares. If the surface is fractal, the number of squares is related to the size of the square according to the following equation:

$$N(L) = \alpha L^{-D} \tag{3}$$

where N(L) is the number of boxes of size L×L, L is a measure of length in pixels, D is the fractal dimension, and α is a proportionality constant dependent on the size of the image. Then, a plot of ln(N) versus ln(L) yields a straight line with a slope of −D. This concept is illustrated in FIG. 4 for the extrudate sample exhibiting sharkskin shown in FIG. 3. A fractal dimension of one corresponds to a smooth surface while increasing values reflect increasing degrees of surface roughness. In this way, extrudate surfaces may be characterized by means of a variable (fractal dimension) that does not depend on scale. This is an important difference between this invention and previous attempts to characterize surface defects by roughness measurements. In addition, due to very short computation times involved, the method of the invention presents an inexpensive alternative characterization technique that may be used in an almost real-time on-line monitoring and control scheme. Such a system may be particularly useful in processes where controlled product surface roughness is desired.

WALL SLIP VELOCITY AND POLYMER FLOW CURVE

Wall slip phenomena in linear polyethylenes have been studied in the past by many research groups (Lupton and Regester, 1965; Blyler and Hart, 1970; Ballenger et al., 1971; Ramamurthy, 1986; Kalika and Denn, 1987; Hatzikiriakos and Dealy, 1991, 1992). However, only recently it was observed by Hill et al. (1990) that the slip velocity of a linear low density polyethylene reported by Kalika and Denn (1987) was a weak function of the L/D ratio of the capillary for long capillaries (L/D>33), thus indicating that the slip velocity is a weak function of pressure at high pressures. This was also confirmed for a series of high density polyethylenes by Hatzikiriakos and Dealy (1992a). They reported that the slip velocity was a strong function of the L/D ratio for short dies and a weak function of L/D for long dies and that the slip velocity does not change with L/D for L/D ratios greater than about 60.

It is also known that the viscosity of linear low polyethylenes is a function of pressure (Duvdevani and Klein, 1967; Kalika and Denn, 1987). The traditional Mooney analysis to determine the slip velocity requires that both the viscosity and the slip velocity are not functions of pressure. Thus, this technique cannot be applied to determine the slip velocity as a function of both pressure and wall shear stress.

Hatzikiriakos and Dealy (1992a) presented a modified Mooney technique for calculating the slip velocity as a function of both wall shear stress and pressure. However, their technique was devised to calculate the slip velocity of a series of high-density polyethylenes whose viscosity does not depend strongly on pressure. Thus, for polymers with a pressure-dependent viscosity their technique should be modified.

Kalika and Denn (1987) in their slip velocity calculations for a LLDPE took into account the pressure dependency of the viscosity. They have demonstrated their method with data obtained from relatively long capillaries. In such capillaries the slip velocity is only a weak function of pressure. Thus, the calculated slip velocity based on the total pressure drop is about equal to the length-averaged slip velocity. However, this is not the case in short capillaries where a slip velocity based on the total pressure drop is not equal to the length-averaged slip velocity.

The techniques (Kalika and Denn, 1987; Hatzikiriakos and Dealy, 1992a) can be combined to develop a method which can be used to calculate the slip velocity as a function of wall shear stress and L/D ratio for materials with a pressure-dependent viscosity. Note that since the slip velocity is a function of pressure, neither the wall shear stress, nor the slip velocity are constants along the capillary as normally assumed in the traditional Mooney analysis. These quantities are functions of the axial distance. In this case, from the pressure drop along the capillary one may only calculate the wall shear stress and the corresponding slip velocity at some axial distance (Hatzikiriakos and Dealy, 1992a).

If the viscosity of the melt is a function of pressure, it can be represented by the following equation:

$$\eta = K \exp(\beta P) \dot{\gamma}^{z-1} \tag{4}$$

where $\eta$ is the viscosity, K is the consistency index, n is the power-law index and $\beta$ is the pressure coefficient of viscosity. The exponential dependence of the viscosity on pressure [$\eta \propto \exp(\beta P)$] is usually valid to first order for relatively small values of pressure. Unfortunately, the validity of this relation can only be checked at low and moderate pressures (see below) due to the fact that at higher values of pressure slip occurs and thus the effect of pressure on viscosity cannot be distinguished with certainty from the effect of pressure on slip velocity. Thus, the analysis of our data presented below assumes that Eq. (4) is also valid for high pressures. To calculate the slip velocity, one may use the following equation (Kalika and Denn, 1987; Hatzikiriakos and Dealy, 1992a):

$$\frac{8u_s(Z_0)}{D} = \dot{\gamma}_A = \frac{4n}{3n+1}\left(\frac{\sigma_{wp}(Z_0)^{1/n}}{K}\right) \tag{5}$$

where $\dot{\gamma}_A$ is the apparent shear rate defined as $32Q/\tau D^3$ where Q is the volumetric flow rate and D is the diameter of the capillary, $u_s$ is the slip velocity and $\sigma_{wp}$ is the pressure-corrected wall shear stress defined below. The value $Z_0$ is some axial distance in the capillary where the wall shear stress is equal to $(P_d - P_m)/(4L/D)$, $P_d$ being the driving pressure (plunger force over reservoir area), and $P_m$ being, the entrance pressure loss (Bagley correction). The pressure at this point can be approximated as to be equal to $(P - P_m)/2$. More details regarding the modified Mooney technique can be found in the paper of Hatzikiriakos and Dealy (1992a).

The pressure-corrected wall shear stress can be calculated from the following equations:

$$\sigma_w = K \exp[\beta P(Z_0)]\left[\frac{3n+1}{4n}\dot{\gamma}_A\right]^n \tag{6}$$

$$\sigma_{wp} = \frac{\sigma_w}{\exp[\beta P(Z_0)]} \tag{7}$$

where the pressure coefficient of viscosity was found to be about $3 \times 10^{-9}$ Pa$^{-1}$ by Hatzikiriakos and Dealy (1992b, 1992d). Using this value, superposition to a satisfactory degree (within 7%) was obtained for data from the stable (no-slip) region in experiments with capillaries having L/D ratios in the range 10-100. Thus, it can be seen that the exponential dependence of the viscosity on pressure is valid (within 7%) for pressures up to 48 MPa (L/D=100 and maximum shear stress of 0.12 MPa). Thus, Eq. (5) is valid for pressures up to 48 MPa. The values of K and n calculated from the no-slip region, using the pressure-corrected data and after applying the Rabinowitch correction were found to be: K=0.0085 MPa S$^n$ and n=0.618.

RESULTS AND DISCUSSION

In this work, capillary experiments were performed by using capillaries of various L/D ratios and diameters to determine the apparent flow curves and consequently the slip velocity of the resin used. Details on the experiments and analysis of data can be found elsewhere (Hatzikiriakos and Dealy, 1992a, 1992b).

Figure 5:
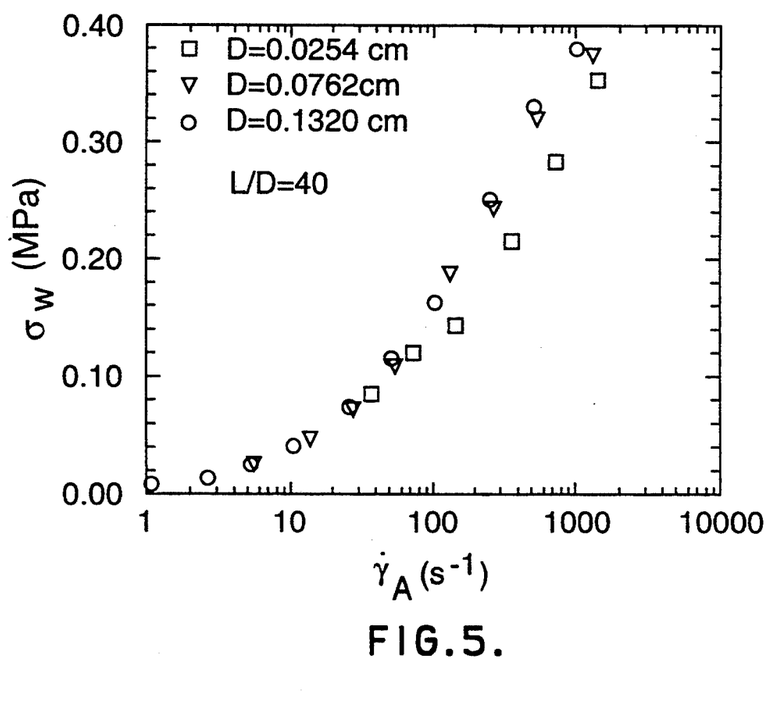
FIG. 5 is graphical representation of the apparent flow curve of the LLDPE for three capillaries of the same L/D ratio and different diameters.

FIG. 5 shows the apparent flow curve of the LLDPE for three capillaries of the same L/D ratio and different diameters. Note that a semi-log plot is used to show clearly the critical shear stress for the onset of slip. Keeping the L/D ratio constant, ensures that the effect of pressure on the melt viscosity remains constant. Thus, the critical shear stress can be determined from the point at which the three apparent flow curves diverge. From FIG. 5 it can be observed that this value is about 0.12 MPa. This value is consistent with other values reported in the literature for LLDPEs of comparable molecular weights (Kurtz, 1984; Ramamurthy, 1986).

Once the critical shear stress has been determined, one may use the data in the stable region (no-slip for $\sigma_w < 0.12$ MPa) to obtain the coefficient describing the pressure dependence of viscosity (Hatzikiriakos and Dealy, 1992b). Finally, apparent flow curves obtained from dies having the same diameter but different L/D are plotted in FIG. 6. Note that these apparent flow curves have not been corrected for the effect of pressure on the viscosity of the melt.

Figure 6:
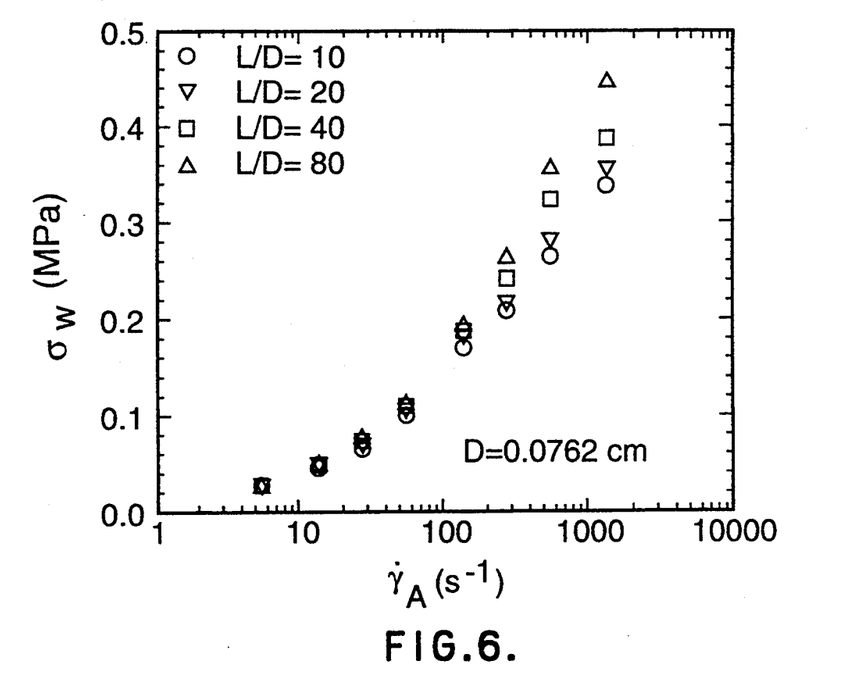
FIG. 6 is a graphical representation of the apparent flow curve of the LLDPE for three capillaries of the same diameter and different L/D ratio.
Figure 7:
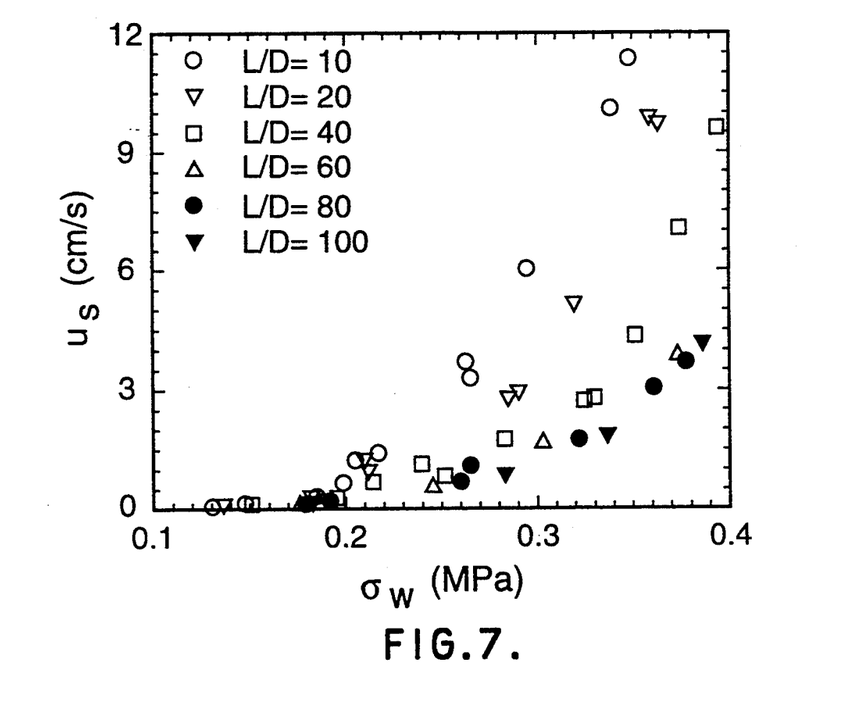
FIG. 7 is a graphical representation of slip velocity as a function of wall shear stress and pressure.

Using equations 5, 6 and 7 and the data of FIG. 6, the slip velocity is calculated as a function of both wall shear stress and pressure and it is plotted in FIG. 7. It may be observed that the slip velocity increases with both wall shear stress and L/D ratio, thus, pressure. These observations are in agreement with experimental findings reported previously by Hill et al. (1990) and Hatzikiriakos and Dealy (1992a) for the pressure dependency of the slip velocity. It can be seen that the slip velocity is a strong function of L/D for small L/D ratios and a weak function of the L/D ratio for longer dies and that it remains constant for L/D greater than about 60.

Figure 8:
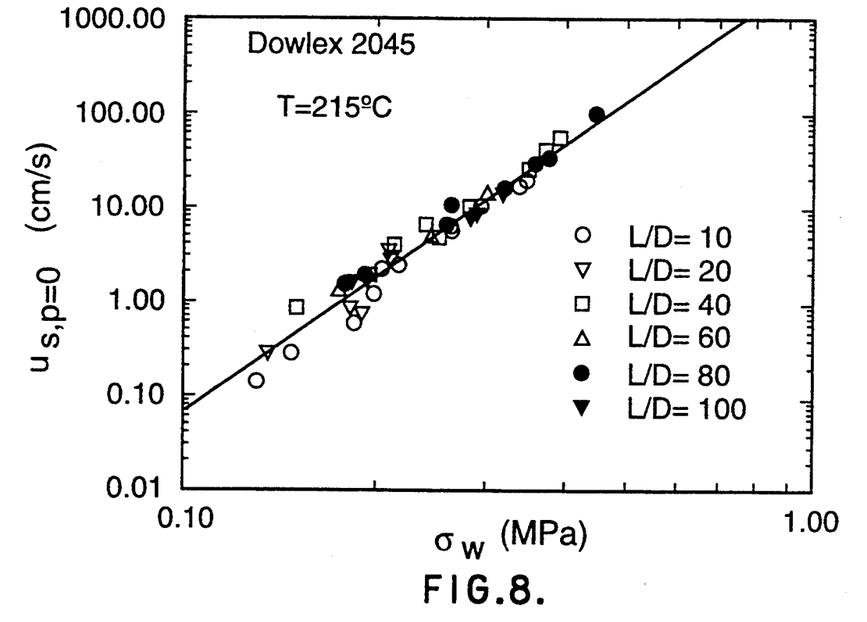
FIG. 8 is a graphical representation of pressure-corrected slip velocity as a function of the wall shear stress and pressure.

It can be observed from FIG. 7 that each curve for a given L/D ratio can be approximately represented by a power-law expression ($u_s \propto \sigma_w^m$) FIG. 8 shows the pressure-corrected slip velocities, $u_s$, P=0, of FIG. 7. Note that these slip velocities now refer to ambient pressure. In general, the data superimpose very well except for some scatter at low shear stresses which is expected (transition from no-slip to slip). The continuous line represents a least-squares fit and has a slop of 4.7. For another LLDPE resin of similar molecular weight and distribution as Dowlex 2045, Hill et al. (1990), calculated a power-law exponent of 6, Ramamurthy found a slop of 2, while Hatzikiriakos et al (1992e) reported a value of 4. A value of 4.59 was calculated by Lau and Schowalter (1986) for the slip data of an ethylene/propylene copolymer reported by Vinogradov and Ivanova (1967). In spite of these disparate exponent values, it has to be pointed out that the shear stress range used to calculate this exponent is very short and the calculated value of the exponent is very sensitive to the shear stress range, number of data used in the calculation, and to the degree of experimental error.

Figure 9:
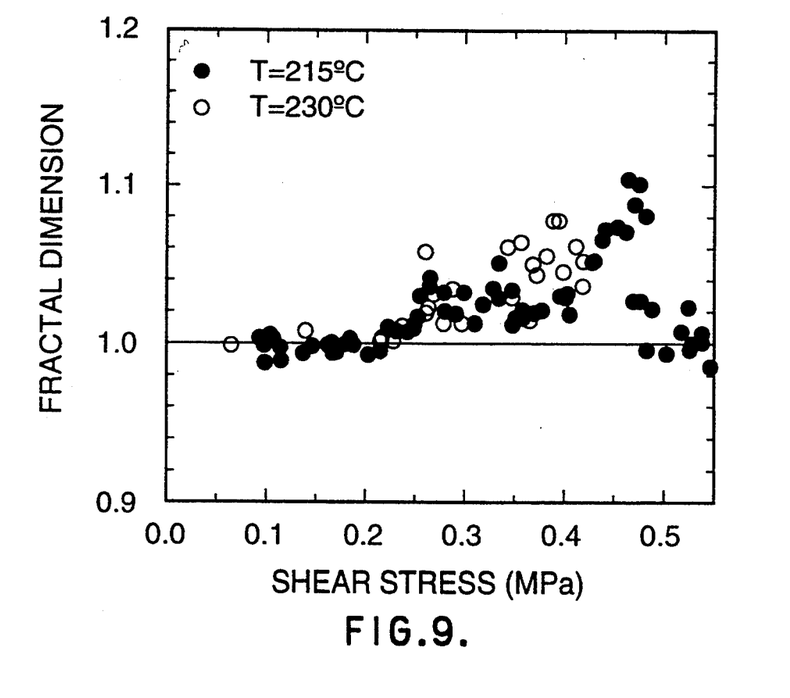
FIG. 9 is a graphical representation of the fractal dimension of extrudates obtained from capillaries of various L/D ratios and diameters as a function of the wall shear stress for two temperatures.

FIG. 9 is a plot of the fractal dimension of extrudates obtained from capillaries of various L/D ratios and diameters as a function of the wall shear stress for two temperatures. It can be observed that for wall shear stresses less than about 0.22 MPa, the fractal dimension has a value of about one, which indicates that the extrudates obtained under such conditions are smooth, fully in agreement with visual observations. However, for wall shear stresses greater than about 0.22 MPa the fractal dimension becomes greater than one, which reflects the appearance of roughness on the extrudate surface. Thus, it can be concluded that the onset of slip (at 0.12 MPa) is not accompanied by the onset of extrudate distortion (at 0.22 MPa). This is in agreement with previous observations (Ramamurthy 1986). Ramamurthy reported that the critical shear stress for onset of slip for a linear low density polyethylene was about 0.1 MPa, but distortions appeared to be present at wall shear stresses only greater than about 0.15 MPa. In the present case, the critical shear stress for the onset of slip is about 0.12, while the extrudates appear to be rough for wall shear stresses only greater than about 0.22 MPa.

It can also be observed from FIG. 9 that the scatter of the data also increases with wall shear stress for wall shear stresses greater than 0.22 MPa. The uncertainty in the fractal dimension measurements was estimated not from true repeats but from the analysis of different sections of the image of each extrudate, and it was found to vary between 0.01 and 0.02. The following model has been fitted to the data in the stable and sharkskin regions:

$$FD = 1 \; \sigma_w < \sigma_s,$$

$$FD = 1 + m\left(\frac{\sigma_w}{\sigma_s} - 1\right) \sigma_w \geqq \sigma_m,$$

where FD is the fractal dimension and $\sigma_S$ is the critical shear stress for the onset of sharkskin. By using regression techniques, the parameters $\sigma_S$ and m were found to be equal to 0.22 and 0.054, respectively, and a F-test proved the regression to have a 95% significance level. The standard deviation is plotted as a function of the wall stress (abscissa) in the inset of FIG. 9. Any uncertainties in the data need to be minimized before the fractal dimension can be used as a reliable tool in roughness monitoring. This can be achieved by an improvement of lighting conditions and image enhancement techniques which are typically based on heuristic algorithms, as well as the use of high resolution image processing boards.

It can also be observed that the fractal dimension drops down to unity for wall shear stresses greater than 0.5 MPa which marks the onset of gross melt fracture. This discontinuity indicates that the surface of the grossly distorted extrudates become again "smooth" in the sense that the surface of a small portion of the extrudate (smaller than the size of a gross distortion but larger than the size of a sharkskin distortion) exhibits no roughness. This is an essential difference between the method of the present invention and previous profilometric techniques, which also points out the different mechanisms for the occurrence of surface and gross extrudate distortion. While surface distortion may be a result of adhesive failure of the polymer-wall interface at the exit of the die (Kurtz, 1984), gross melt fracture may be initiated at the entrance of the capillary as a result of cohesive failure of a layer within the polymer (Bergem, 1976). A thorough discussion on the subject as well as a review of the various proposed scenarios to explain both phenomena is given by Hatzikiriakos and Dealy (1992c). To differentiate between grossly distorted and smooth extrudates, in addition to the fractal dimension, one should consider the scatter of data which is greater in the gross fracture region. The results for the two temperatures in FIG. 7 show no distinct differences, something expected due to the small difference between the two temperatures. Beaufils et al. (1989) also observed practically no effect of the temperature on the roughness-wall shear stress curve although a temperature differential of 60° C. was used.

Figure 10:
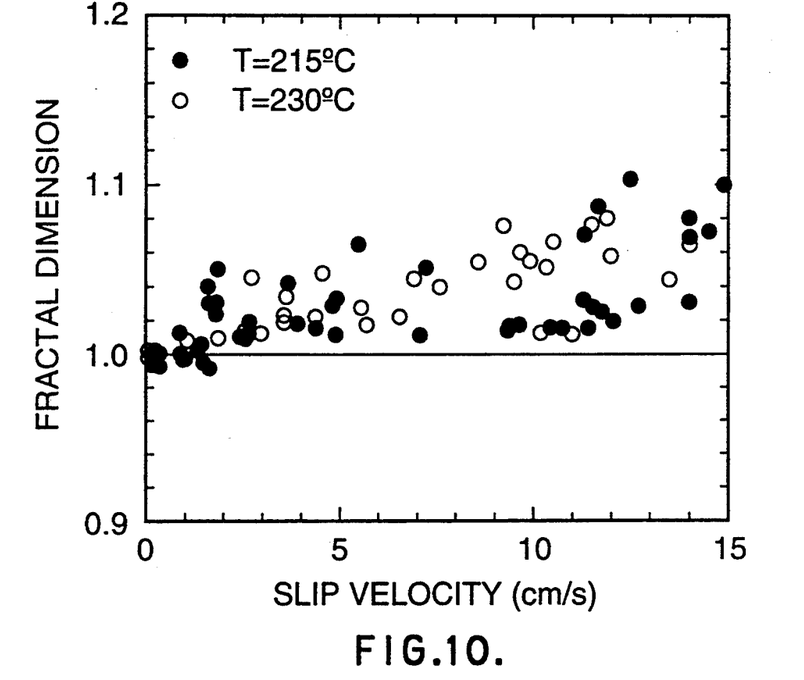
FIG. 10 is a graphical representation of the fractal dimension of extrudates obtained from capillaries as a function of the slip velocity at two temperatures.

Finally, the fractal dimension as a function of the slip velocity at two temperatures is shown in FIG. 10. It can be seen that the fractal dimension deviates from a value of one for slip velocities greater than approximately 2 cm/s. This observation supports our previous conclusion that the onset of slip is not accompanied by the onset of surface distortion. Note that the results for the two temperatures in FIGS. 9 and 10 show no distinct differences, something expected due to the small difference between the two temperatures. Beaufils et al. (1989) also observed a very small effect of the temperature on the roughness-wall shear stress curves although a temperature differential of 60° C. was used.

CONCLUSIONS

Digital image processing techniques were used to characterize the surface roughness of solidified extrudates from capillary extrusion experiments of a LLDPE. The fractal dimension of the surface distortions was determined and it was found to increase with both the wall shear stress and slip velocity. While the fractal dimension has a value of one for wall shear stresses less than a critical value, it was generally found to increase for wall shear stresses greater than this critical value, signifying the transition from a smooth surface to one of increasing roughness. In addition, the fractal dimension was found to deviate from one for slip velocities greater than about 2 cm/s, thus indicating that slip in the die is not always accompanied by extrudate distortion. This is so, because the necessary condition for surface fracture is not only that the wall shear stress has to overcome a critical value but also the polymer has to be stretched to a certain extent before it leaves the capillary die.

SUMMARY OF DISCLOSURE

In summary of this invention, a new approach has been adopted to study the sharkskin phenomenon and characterize the extrudate surface roughness observed in polymer melt extrusion of a linear low-density polyethylene (LLDPE) through capillary dies. The surface roughness of solidified extrudate samples was analyzed by means of digital image processing techniques. The fractal dimension of the extrudate surface was used as a quantitative measure of roughness and the effect of both the wall shear stress and slip velocity on the severity of the sharkskin phenomenon was studied. The onset of surface roughness may be directly determined and it was found to lag behind the onset of slip in the die. The main advantage of the present method is the scale independence of the roughness measure. In addition, since only digital images of extrudates are required for the detection of surface roughness and due to short processing times involved, this method may be employed in on-line monitoring systems for the production of films with controlled roughness. Modifications are possible within the scope of the invention.

REFERENCES

Avnir, D., ed., The Fractal Approach to Heterogeneous Chemistry: Surfaces, Colloids, Polymers (Wiley, New York, 1989).

Ballenger, T. F., I. J. Chen, J. W. Crowder, G. E. Hagler, D. C. Bogue, and J. L. White, "Polymer Melt Flow Instabilities in Extrusion: investigation of the Mechanism and Material and Geometric Variables," Trans. Soc. Rheol. 15, 195 (1971).

Barnsley, M. F., R. L. Devaney, B. B. Mandelbrot, H.-O. Peitgen, D. Saupe, and R. F. Voss, The Science of Fractal Images (Springer, New York, 1988).

Barrett, A. M., M. D. Normand, M. Peleg, and E. Ross, "Characterization of the Jagged Stress-Strain Relationships of Puffed Extrudates using Fast Fourier Transforms and Fractal Analysis, "J. Food Sci. 57, 227 (1992).

Beaufils, P., B. Vergnes, and J. F. Agassant, "Characterization of the Sharkskin Defect and its Development with the Flow Conditions," Intern. Polymer Processing IV, 78 (1989).

Bergem, N., "Visualization Studies of Polymer Melt Flow Anomalies in Extrusion," Proceedings of the 7th International Congress of Rheology (Swedish Society of Rheology, Gothenberg, 1976), p. 50.

Blyler, L. L. and A. C. Hart, "Capillary Flow Instability of Ethylene Polymer Melts," Polym. Eng. Sci. 10, 193 (1970).

Cogswell, N. F., "Stretching Flow Instabilities at the Exits of Extrusion Dies," J. Non-Newt. Fluid Mech. 2, 7 (1977).

Cogswell, N. F., "Converging Flow and Stretching Flow: A Compilation." J Non-Newt. Fluid Mech. 4, 23 (1978).

Denn, M. M., "Issues in Viscoelastic Fluid Mechanics," Ann. Rev. Fluid. Mech. 22, 13 (1990).

Denn, M. M., "Surface-Induced Effects in Polymer Melt Flow," in Theoretical and Applied Rheology, edited by P. Moldenaers and R. Keunings (Elsevier, Amsterdam, 1992), Vol. 1, p. 70.

Duvdevani, I. J. and I. Klein, "Analysis of Polymer Melt Flow in Capillaries Including Pressure Effects," SPE J. 23, 41 (December 1967).

Ellis, K., "Characterization of Solid Phase Propagation in an Electrolyte Solution via Digital Image Processing," MASc thesis, Department of Chemical Engineering, University of Waterloo, Waterloo, Ontario, Canada (1991).

Falconer, K., Fractal Geometry: Mathematical Foundations and Application. (Wiley, New York, 1990).

Feder, J., Fractals (Plenum, New York, 1988).

Hatzikiriakos, S. G. and J. M. Dealy, "Wall Slip of a Molten High Density Polyethylene I: Sliding Plate Rheometer Studies," J. Rheol. 35, 497 (1991).

Hatzikiriakos, S. G. and J. M. Dealy, "Wall Slip of a Molten High Density Polyethylenes 11: Capillary Rheometer Studies," J. Rheol. 36, 703 (1992a).

Hatzikiriakos, S. G. and J. M. Dealy, "Start-up of Pressure Transients in a Capillary Rheometer," Proceedings of the 38th ANTEC, Detroit, (1992b), p. 1743.

Hatzikiriakos, S. G. and J. M. Dealy, "Role of Slip and Fracture in the Oscillating Flow of HDPE in a Capillary," to appear in J. Rheol, 36, (1992c).

Hatzikiriakos, S. G. and J. M. Dealy, "Start-up of Pressure Transients in a Capillary Rheometer," accepted in Polym. Eng. Sci. (1992d).

Hatzikiriakos, S. G., C. W. Stewart, and J. M. Dealy, "Effect of Surface Coatings on Wall Slip of LLDPE," accepted in Intern. Polym. Proc. (1992e).

Hill, D. A., T. Hasegawa, and M. M. Denn. "On the Apparent Relation between Adhesive Failure and Melt Fracture," J. Rheol. 34, 891 (1990).

Howells, E. R. and J. J. Benbow, "Flow Defects in Polyethylene Melts," Trans. Plast. Inst. 30, 240 (1962).

Kalika, D. S. and M. M. Denn, "Wall Slip and Extrudate Distortion in Linear Low-Density Polyethylene." J. Rheol. 31, 815 (1987).

Kurtz, S. J., "Die Geometry Solutions to Sharkskin Melt Fracture," in B. Mena, A. Garcia-Rejon, and C. Rangel-Nafaille, eds., Advances in Rheology (UNAM Press, Mexico, 1984), Vol. 3, p. 399.

Kurtz, S. J., "The Dynamics of Sharkskin Melt Fracture in LLDPE," paper presented at the 7th Annual Meeting of the Polymer Processing Society, Hamilton, Ontario (1991).

Kurtz, S. J., "The Dynamics of Sharkskin Melt Fracture in LLDPE; Effect of Die Geometry," in Theoretical and Applied Rheology, edited by P. Moldenaers and R. Keunings (Elsevier, Amsterdam, 1992), Vol. 1, p. 377.

Lau, H. C. and W. R. Schowalter, "A Model for Adhesive Failure of Viscoelastic Fluids During Flow," J. Rheol. 30, 193 (1986).

Lupton, J. M. and J. W. Regester, "Melt Flow of Polyethylene at High Rates," Polym. Eng. Sci. 5, 235 (1965).

Mandelbrot, B. B., The Fractal Geometry of Nature (Freeman, San Francisco, 1982).

Moynihan, R. H., D. G. Baird, and R. Ramanathan, "Additional Observations on the Surface Melt Fracture Behaviour of Linear Low-Density Polyethylene," J. Non-Newt. Fluid Mech. 36, 255 (1990).

Petrie, C. J. S. and M. M. Denn, "Instabilities in Polymer Processing," AIChE J. 22, 209 (1976).

Piau, J. M., N. El-Kissi, and B. Tremblay, "Low Reynolds Number Flow Visualization of Linear and Branched Silicones Upstream of Orifice Dies," J. Non-Newt. Fluid Mech. 30, 197–232 (1988).

Piau, J. M., N. El-Kissi, and B. Tremblay, "Influence of Upstream Instabilities and Wall Slip on Melt Fracture and Sharkskin Phenomenon during Silicones Extrusion through Orifice Dies," J. Non-Newt. Fluid Mech. 34, 145 (1990).

Ramamurthy, A. V., "Wall Slip in Viscous Fluids and Influence of Materials of Construction," J. Rheol. 30, 337 (1986).

Takayasu, H., Fractals in the Physical Sciences (Manchester University Press, Manchester, 1990)

Tong, P. P., "Sharkskin Melt Fracture Behaviour of LLDPE Film Resins," paper presented at the 62nd Annual Meeting of the Society of Rheology, Santa Fe, N.M. (1990).

Tordella, J. P., "Unstable Flow of Molten Polymers," in F. R. Eirich, ed., Rheology (Academic, New York, 1969), Vol. 5, p. 57.

Tremblay, B., "Sharkskin Defects of Polymer Melts: The Role of Cohesion and Adhesion," J. Rheol. 35, 985 (1991).

Vinogradov, G. V. and L. I. Ivanova, "Viscous Properties of Polymer Melts and Elastomers Exemplified by Ethylene-Propylene Copolymer," Rheol. Acta 6, 209 (1967).

White, J. L., "Critique of Flow Patterns in Polymer Fluids at the Entrance of a Die and Instabilities Leading to Extrudate Distortion." Appl. Polymer Symposium 20, 155 (1973).

What I claim is:

1. A method for controlling the surface roughness of an extruded polymeric material, which comprises:
   extruding a polymeric material,
   forming a digital image of a surface of said extruded polymeric material,
   determining the fractal dimension of any surface distortions of said extruded surface from said digital image as a measure of surface roughness, and
   adjusting conditions of extruding the polymeric material to provide an extruded polymeric material having a desired surface roughness.

2. The method of claim 1 wherein said digital image is formed by:
   dividing the surface into a large number of pixels, and
   measuring and recording the intensity of light associated with each pixel to obtain a representation of the surface in the form of a large array of numbers corresponding to the light intensity of each pixel.

3. The method of claim 1 wherein said fractal dimension is determined by:
   overlaying a grid of squares onto the digital image,
   counting the number of said squares containing a piece of a surface outline of said extruded polymeric material,
   repeating said steps of overlaying and counting for different grid squares,
   plotting ln(N) against ln(L) to yield a straight line having a slope of −D, from the relationship:

$$N(L) = \alpha L^{-D}$$

where
   N (L) is the number of boxes of size L×L,
   D is a the fractal dimension,
   $\alpha$ is the proportionality constant dependent on the size of the image, and
   determining the fractal dimension from the slope of the straight line.

4. A method of inhibiting the formation of surface roughness of an extruded polymeric material, which comprises:
   extruding a polymeric material,
   forming a digital image of a surface of said extruded polymeric material,
   determining the fractal dimension of said surface from said digital image as a measure of surface roughness, and
   adjusting conditions of extruding said polymeric material to achieve a fractal dimension which is approximately unity.

5. The method of claim 4 wherein said determination of fractal dimension is made during continuous extrusion of polymeric material and any said adjustment is made during said continuous extrusion.

6. The method of claim 1 wherein said determination of said fractal dimension is made during continuous extrusion of said polymeric material and said adjusting step is effected during said continuous extrusion.

7. The method of claim 4 wherein said fractal dimension is determined by:
   forming a digital image of the surface of the extruded material by:
   dividing the surface into a large number of pixels, and
   measuring and recording the intensity of light associated with each pixel to obtain a representation of the surface in the form of a large array of numbers corresponding to the light intensity in each pixel, overlaying a grid of squares onto the digital image, counting the number of said squares containing a piece of a surface outline of the extruded polymeric material, repeating said steps of overlaying and counting for different grid squares, plotting ln(N) against ln(L) to yield a straight line having a slope of −D, from the relationship:

$$N(L) = \alpha L^{-D}$$

where

N (L) is the number of boxes of size L×L,

D is a the fractal dimension,

α is the proportionality constant dependent on the size of the image, and determining the fractal dimension from the slope of the straight line.

* * * * *